US010224852B2

United States Patent
(12) United States Patent
Morita

(10) Patent No.: US 10,224,852 B2
(45) Date of Patent: Mar. 5, 2019

(54) CONTROL DEVICE OF INDUCTION MOTOR

(71) Applicant: FANUC CORPORATION, Minamitsuru-gun, Yamanashi (JP)

(72) Inventor: Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 78 days.

(21) Appl. No.: 15/876,639

(22) Filed: Jan. 22, 2018

(65) Prior Publication Data

US 2018/0212543 A1 Jul. 26, 2018

(30) Foreign Application Priority Data

Jan. 25, 2017 (JP) ................................ 2017-011170

(51) Int. Cl.

*H02P 21/24* (2016.01)
*H02P 21/22* (2016.01)
*H02P 21/14* (2016.01)

(52) U.S. Cl.

CPC ............ *H02P 21/24* (2016.02); *H02P 21/141* (2013.01); *H02P 21/22* (2016.02)

(58) Field of Classification Search

CPC ........ H02P 21/22; H02P 27/06; H02P 21/141; H02P 21/12; H02P 21/20; H02P 21/24

See application file for complete search history.

(56) References Cited

U.S. PATENT DOCUMENTS 5,446,363 A * 8/1995 Kurosawa ............... H02P 21/09 318/806
5,475,293 A * 12/1995 Sakai ...................... H02P 21/04 318/802
5,629,598 A * 5/1997 Wilkerson ................ H02P 1/42 318/802
2008/0303476 A1* 12/2008 Iwashita ............. H02P 21/0003 318/766
2011/0204831 A1* 8/2011 Iwaji ..................... B60L 15/025 318/244

FOREIGN PATENT DOCUMENTS

JP 60-200791 10/1985
JP 2-111282 4/1990

* cited by examiner

*Primary Examiner* — Thai Dinh
(74) *Attorney, Agent, or Firm* — Wenderoth, Lind & Ponack, L.L.P.

(57) ABSTRACT

The control device of an induction motor includes a current command maximum value setting portion that sets an excitation current command maximum value and a torque current command maximum value. The current command maximum value setting portion changes, when the induction motor is accelerated/decelerated, the excitation current command maximum value based on which one of first and second excitation current command maximum values is lower, and changes the torque current command maximum value based on the excitation current command maximum value and an allowable maximum current value of a drive portion. The first excitation current command maximum value is based on the allowable maximum current value, and the second excitation current command maximum value is based on a power supply voltage of the drive portion, a current frequency of the drive current and an excitation inductance of the induction motor.

8 Claims, 5 Drawing Sheets

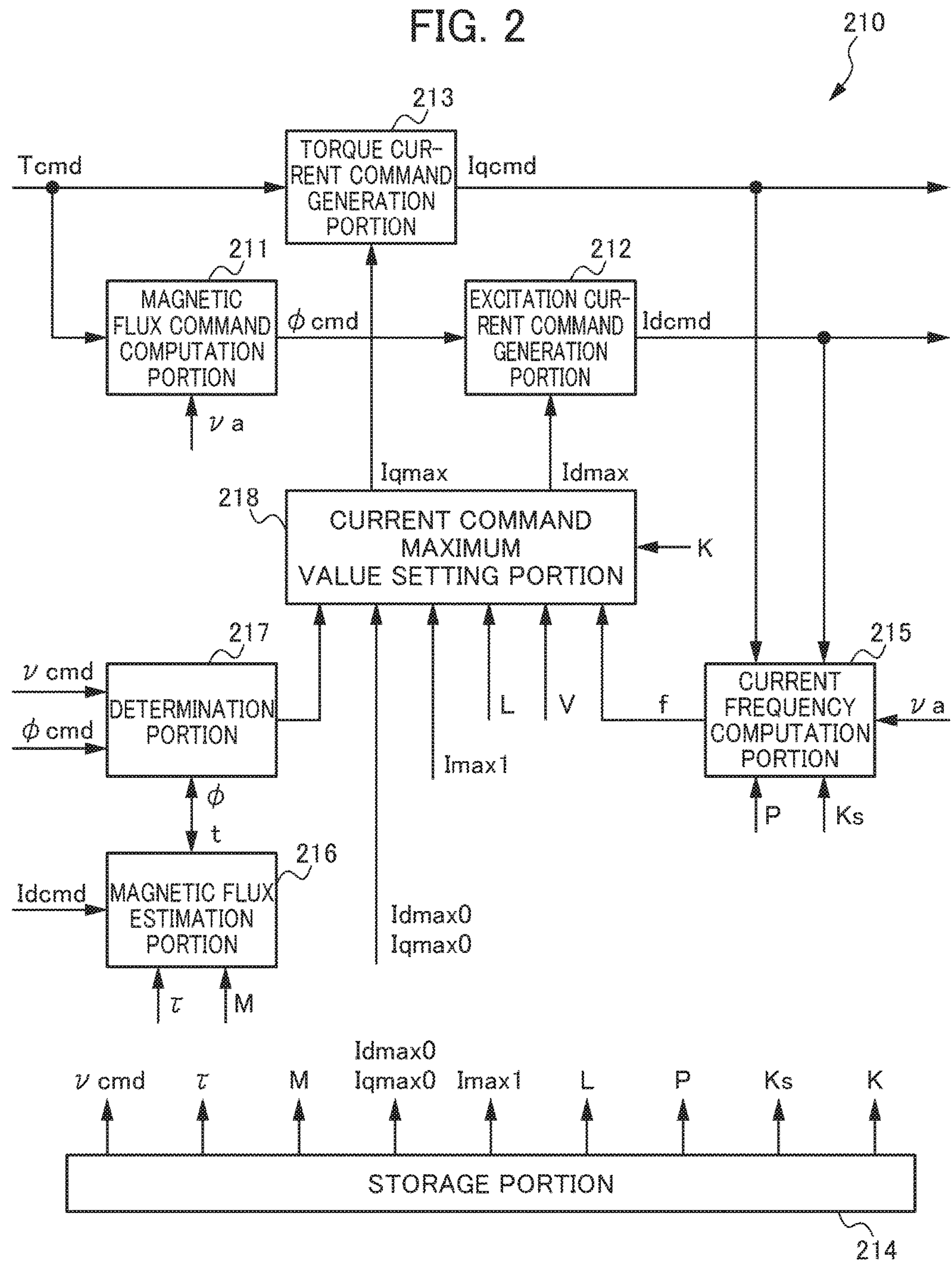

FIG. 2
210
213
TORQUE CURRENT COMMAND GENERATION PORTION
Tcmd
Iqcmd
211
MAGNETIC FLUX COMMAND COMPUTATION PORTION
ϕ cmd
212
EXCITATION CURRENT COMMAND GENERATION PORTION
Idcmd
ν a
Iqmax
Idmax
218
CURRENT COMMAND MAXIMUM VALUE SETTING PORTION
K
217
ν cmd
ϕ cmd
DETERMINATION PORTION
L
V
f
215
CURRENT FREQUENCY COMPUTATION PORTION
ν a
Imax1
ϕ
t
P
Ks
216
Idcmd
MAGNETIC FLUX ESTIMATION PORTION
Idmax0
Iqmax0
τ
M
ν cmd
τ
M
Idmax0
Iqmax0
Imax1
L
P
Ks
K
STORAGE PORTION
214

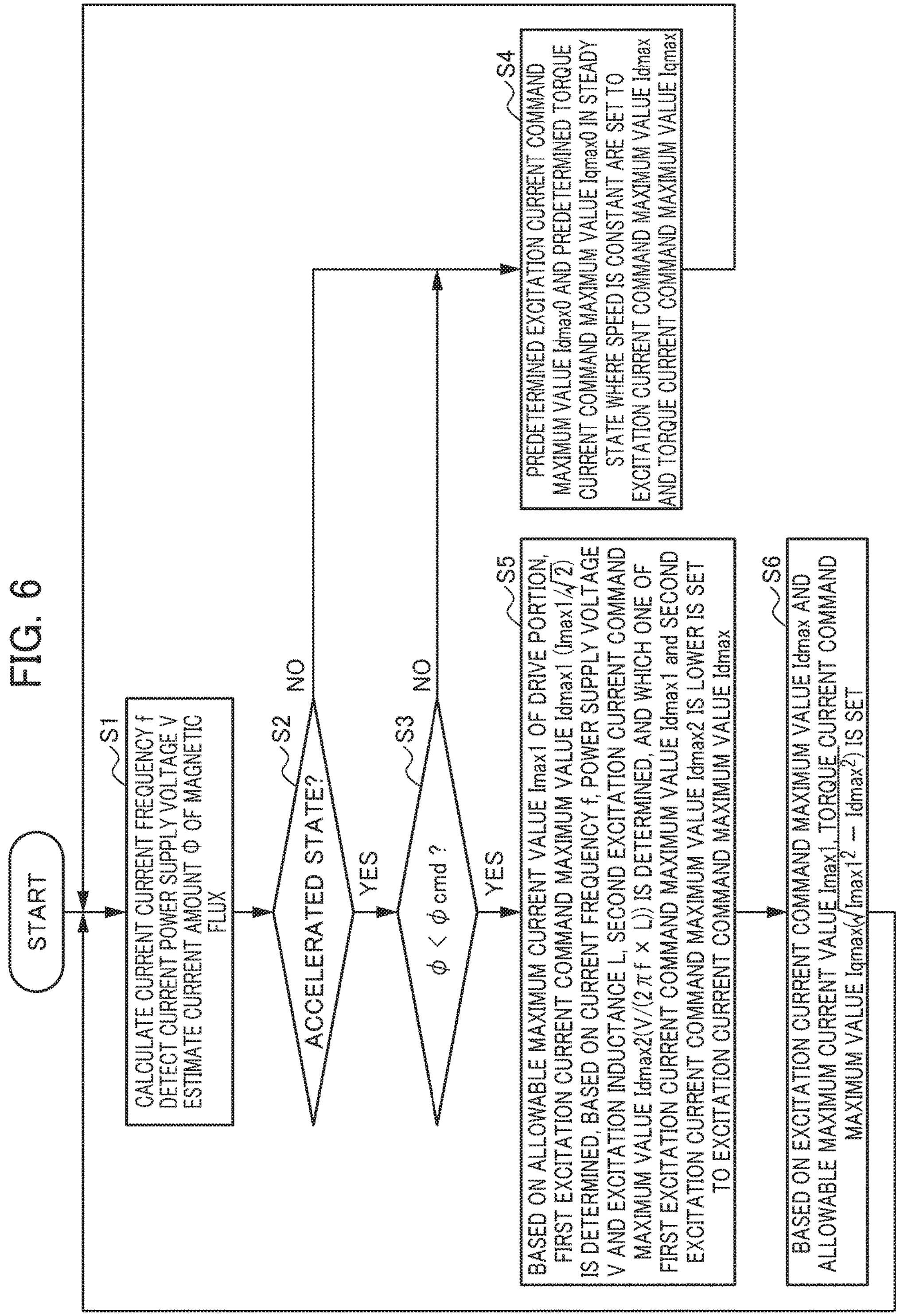

FIG. 6
START
S1
CALCULATE CURRENT FREQUENCY f
DETECT CURRENT POWER SUPPLY VOLTAGE V
ESTIMATE CURRENT AMOUNT Φ OF MAGNETIC FLUX
S2
ACCELERATED STATE?
YES
NO
S3
φ < φcmd ?
YES
NO
S4
PREDETERMINED EXCITATION CURRENT COMMAND MAXIMUM VALUE Idmax0 AND PREDETERMINED TORQUE CURRENT COMMAND MAXIMUM VALUE Iqmax0 IN STEADY STATE WHERE SPEED IS CONSTANT ARE SET TO EXCITATION CURRENT COMMAND MAXIMUM VALUE Idmax AND TORQUE CURRENT COMMAND MAXIMUM VALUE Iqmax
S5
BASED ON ALLOWABLE MAXIMUM CURRENT VALUE Imax1 OF DRIVE PORTION, FIRST EXCITATION CURRENT COMMAND MAXIMUM VALUE Idmax1 (Imax1/√2) IS DETERMINED, BASED ON CURRENT FREQUENCY f, POWER SUPPLY VOLTAGE V AND EXCITATION INDUCTANCE L, SECOND EXCITATION CURRENT COMMAND MAXIMUM VALUE Idmax2(V/(2πf × L)) IS DETERMINED, AND WHICH ONE OF FIRST EXCITATION CURRENT COMMAND MAXIMUM VALUE Idmax1 and SECOND EXCITATION CURRENT COMMAND MAXIMUM VALUE Idmax2 IS LOWER IS SET TO EXCITATION CURRENT COMMAND MAXIMUM VALUE Idmax
S6
BASED ON EXCITATION CURRENT COMMAND MAXIMUM VALUE Idmax AND ALLOWABLE MAXIMUM CURRENT VALUE Imax1, TORQUE CURRENT COMMAND MAXIMUM VALUE Iqmax(√Imax1² − Idmax²) IS SET

CONTROL DEVICE OF INDUCTION MOTOR

This application is based on and claims the benefit of priority from Japanese Patent Application No. 2017-011170, filed on 25 Jan. 2017, the content of which is incorporated herein by reference.

BACKGROUND OF THE INVENTION

Field of the Invention

The present invention relates to a control device which performs vector control on an induction motor.

Related Art

As the control device of an induction motor used in a machine tool or the like, a control device which performs vector control is known. The control device described above divides a primary current supplied to the induction motor into an excitation current for generation of a magnetic flux and a secondary current, that is, a torque current so as to perform control. Patent Documents 1 and 2 disclose technologies in which in the control device described above, an excitation current command value for generation of the excitation current and/or a torque current command value for generation of the torque current is changed.

Patent Document 1 discloses a problem in which when the output voltage of a converter is lowered due to a voltage drop in an alternating current power supply or the like, the excitation current corresponding to the excitation current command value is prevented from being passed through the motor. In order to cope with this problem, Patent Document 1 discloses a technology in which the torque current command value is limited according to the voltage of the alternating current power supply or the input voltage of an inverter. In this way, even when the voltage supplied to the inverter is lowered, a torque generated in the motor is limited but the excitation current of the motor can be made to follow the command value thereof.

Patent Document 2 discloses a technology in which the output limit value of a torque current adjustment means is changed according to the direct current intermediate voltage value of the inverter. Specifically, when the direct current intermediate voltage value is lower than a predetermined value, the output limit value of a current control system is decreased whereas when the direct current intermediate voltage value is equal to or lower than the predetermined value, the output limit value of the current control system is increased.

Patent Document 1: Japanese Unexamined Patent Application, Publication No. S60-200791

Patent Document 2: Japanese Unexamined Patent Application, Publication No. H02-111282

SUMMARY OF THE INVENTION

Incidentally, for example, when an induction motor is accelerated from a non-excited state, a magnetic flux rises at a time constant which is determined by the circuit constant of the motor. Hence, the rise of the magnetic flux until the magnetic flux reaches a desired magnetic flux after the start of flow of an excitation current is slow.

Furthermore, in a control device which performs vector control, upper limits (maximum values) are set for an excitation current command value and a torque current command value, and for example, when an induction motor is accelerated from a non-excited state, the excitation current command value is limited to the set maximum value. Hence, the rise of a magnetic flux is further slowed down. Consequently, a time necessary to accelerate the induction motor is long.

An object of the present invention is to provide the control device of an induction motor which can reduce a time necessary to accelerate/decelerate the induction motor.

(A) A control device of an induction motor (for example, a control device 1 which will be described later) according to the present invention which performs vector control on the induction motor (for example, a motor 2 which will be described later) includes: an excitation current command generation portion (for example, an excitation current command generation portion 212 which will be described later) which generates an excitation current command value based on a magnetic flux command value and which limits the excitation current command value based on an excitation current command maximum value; a torque current command generation portion (for example, a torque current command generation portion 213 which will be described later) which generates a torque current command value based on a torque command value and which limits the torque current command value based on a torque current command maximum value; a drive portion (for example, a drive portion 300 which will be described later) which supplies a drive current to the induction motor based on the excitation current command value and the torque current command value; and a current command maximum value setting portion (for example, a current command maximum value setting portion 218 which will be described later) which sets the excitation current command maximum value and the torque current command maximum value, where the current command maximum value setting portion changes, when the induction motor is accelerated/decelerated, the excitation current command maximum value based on which one of a first excitation current command maximum value and a second excitation current command maximum value is lower, and changes the torque current command maximum value based on the excitation current command maximum value and an allowable maximum current value of the induction motor or the drive portion, the first excitation current command maximum value is based on the allowable maximum current value and the second excitation current command maximum value is based on a power supply voltage of the drive portion, a current frequency of the drive current and an excitation inductance of the induction motor.

(B) The control device of the induction motor according to (A) may further include: a determination portion (for example, a determination portion 217 which will be described later) which determines whether or not the induction motor is in an accelerated/decelerated state.

(C) The control device of the induction motor according to (B) may further include: a magnetic flux estimation portion (for example, a magnetic flux estimation portion 216 which will be described later) which estimates an amount of magnetic flux of the induction motor from the excitation current command value, a mutual inductance of the induction motor, a time constant of the induction motor and a time which elapses after the determination portion determines that the induction motor is in the accelerated/decelerated state, where the determination portion may determine whether or not the amount of magnetic flux estimated by the magnetic flux estimation portion is lower than the magnetic flux command value, and when the induction motor is in the accelerated/decelerated state, and the amount of magnetic flux estimated by the magnetic flux estimation portion is lower than the magnetic flux command value, the current command maximum value setting portion may change the excitation current command maximum value and the torque current command maximum value.

(D) The control device of the induction motor according to (A) may further include: a current frequency computation portion (for example, a current frequency computation portion 215 which will be described later) which computes the current frequency of the drive current from an actual speed value of the induction motor, a number of polar pairs or a number of poles of the induction motor and a slip frequency of the induction motor.

(E) The control device of the induction motor according to (A) may further include: a voltage detection portion (for example, a voltage detector 302 which will be described later) which detects the power supply voltage of the drive portion.

(F) The control device of the induction motor according to (A) may further include: a storage portion which stores the allowable maximum current value of the induction motor or the drive portion and the excitation inductance of the induction motor.

(G) In the control device of the induction motor according to (A), the current command maximum value setting portion may determine the first excitation current command maximum value Idmax1 by formula (1) below based on the allowable maximum current value Imax1 and a constant K related to the vector control, $$Idmax1 = Imax1 \times K \quad (1),$$

may determine the second excitation current command maximum value Idmax2 by formula (2) below based on the power supply voltage V, the current frequency f and the excitation inductance L, $$Idmax2 = V/(2\pi f \times L) \quad (2),$$

may determine, as the excitation current command maximum value Idmax, which one of the first excitation current command maximum value Idmax1 and the second excitation current command maximum value Idmax2 is lower and may determine the torque current command maximum value Iqmax by formula (3) below based on the excitation current command maximum value Idmax which are determined and the allowable maximum current value Imax1, $$Iqmax = \sqrt{(Imax1^2 - Idmax^2)} \quad (3).$$

(H) In the control device of the induction motor according to (A), the constant K related to the vector control may be $\sqrt{(2)}$.

According to the present invention, it is possible to Provide the control device of an induction motor which can reduce a time necessary to accelerate/decelerate the induction motor.

BRIEF DESCRIPTION OF THE DRAWINGS

FIG. 2 is a diagram showing the circuit configuration of a current command generation portion in a current control portion of the present embodiment;

FIG. 6 is a flowchart showing an operation of changing the excitation current command maximum value and the torque current command maximum value by the control device of the induction motor according to the embodiment of the present invention.

DETAILED DESCRIPTION OF THE INVENTION

Figure 1:
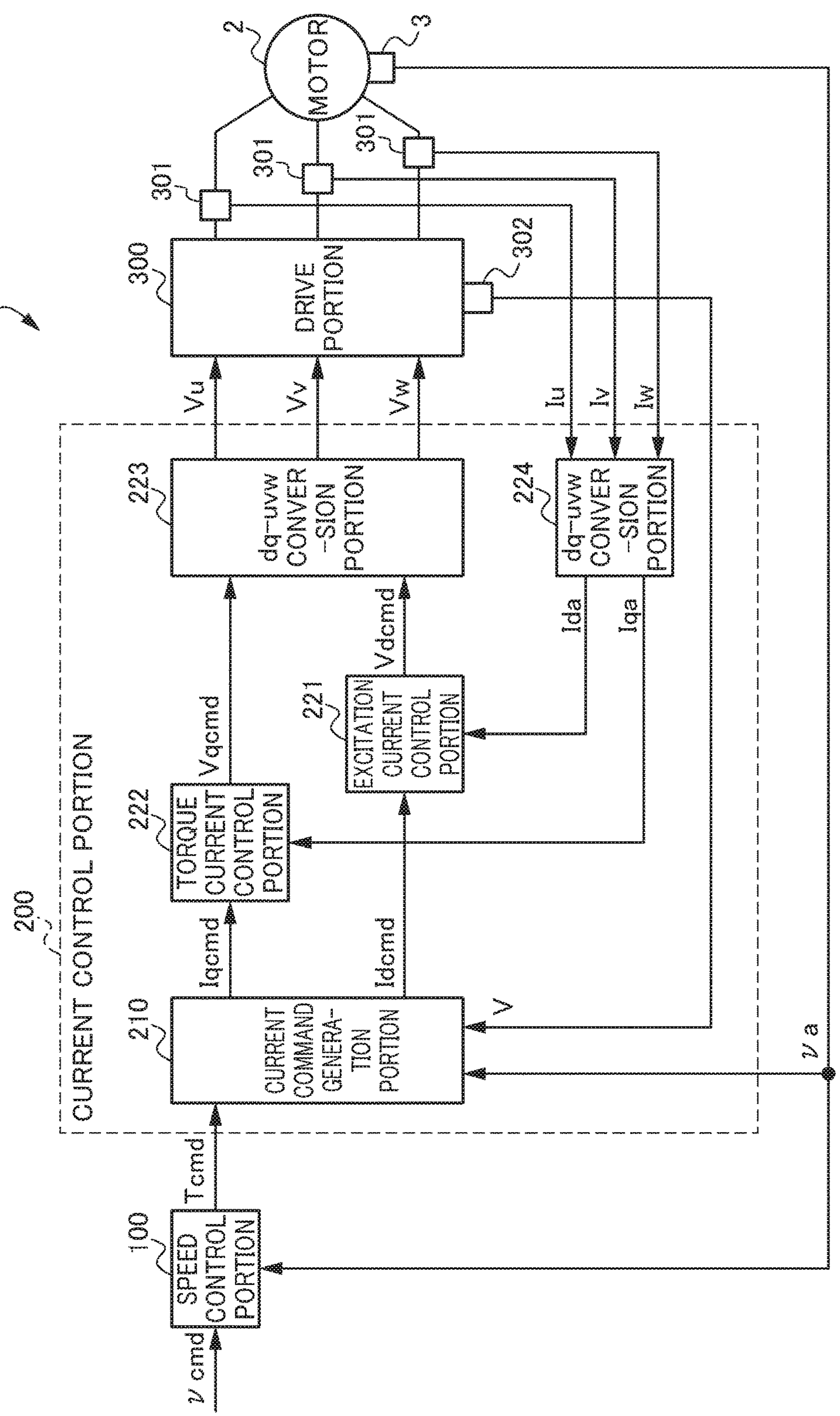
FIG. 1 is a diagram showing the circuit configuration of the control device of an induction motor according to an embodiment of the present invention.

An example of an embodiment of the present invention will be described below with reference to accompanying drawings. In the drawings, the same or corresponding portions are identified with the same reference numerals.

FIG. 1 is a diagram showing the circuit configuration of the control device of an induction motor according to an embodiment of the present invention. The control device 1 shown in FIG. 1 is a device for driving the induction motor (hereinafter referred to as a "motor") 2 which drives and rotates the spindle of a machine tool such as a spindle machine. The control device 1 performs vector control in which the primary current of the motor 2, that is, a drive current is divided into an excitation (d phase) current for generation of a magnetic flux and a secondary current, that is, a torque (q phase) current and is controlled. The control device 1 includes a speed control portion 100, a current control portion 200 and a drive portion 300.

The speed control portion 100 and the current control portion 200 are so-called numerical control devices which are formed with, for example, a computation processor such as a DSP (Digital Signal Processor) or an FPGA (Field-Programmable Gate Array). The functions of the speed control portion 100 and the current control portion 200 are realized by performing predetermined software (programs) stored in a storage portion (for example, a storage portion 214 which will be described later). The functions of the speed control portion 100 and the current control portion 200 may be realized by cooperation of hardware and software or may be realized only by hardware (electronic circuit).

The speed control portion 100 reads a speed command value vcmd from a machining program stored in the storage portion (for example, the storage portion 214 which will be described later), and inputs the actual speed value va of the motor 2 which is detected by a speed detector 3 provided in the motor 2. The speed control portion 100 generates a torque command value Tcmd based on a difference between the speed command value vcmd and the actual speed value va.

The current control portion 200 inputs the torque command value Tcmd, the actual speed value va of the motor 2, the output currents of the drive portion 300 which are detected by a current detector 301 provided in the drive portion 300, that is, actual current values (drive currents) Iu, Iv and Iw for driving the motor 2 and the power supply voltage V of the drive portion 300 which is detected by a voltage detector 302 provided in the drive portion 300. The current control portion 200 generates, based on the torque command value Tcmd, the actual speed value va, the actual. current values Iu, Iv and Iw and the power supply voltage V, voltage command values Vu, Vv and Vw for driving the drive portion 300. The current control portion 200 includes a current command generation portion 210, an excitation current control portion 221, a torque current control portion 222, a dq-uvw conversion portion 223 and a dq-uvw conversion portion 224.

The current command generation portion 210 generates an excitation current command value Idcmd and a torque current command value Iqcmd mainly based on the torque command value Tcmd. The details of the current command generation portion 210 will be described later.

The excitation current control portion 221 generates a d phase voltage command value Vdcmd based on a difference between the excitation current command value Idcmd and a d phase actual current value Ida obtained by converting the actual current values Iu, Iv and Iw with the dq-uvw conversion portion 224.

The torque current control portion 222 generates a q phase voltage command value Vqcmd based on a difference between the torque current command value Iqcmd and a q phase actual current value Iqa obtained by converting the actual current values Iu, Iv and Iw with the dq-uvw conversion portion 224.

The dq-uvw conversion portion 223 converts the d phase voltage command value Vdcmd and the g phase voltage command value Vqcmd into the voltage command values Vu, Vv and Vw of the u, v and w phases. The dq-uvw conversion portion 224 converts the actual current values Iu, Iv and Iw of the u, v and w phases into the d phase actual current value Ida and the q phase actual current value Iqa.

The drive portion 300 generates the actual current values (drive currents) Iu, Iv and Iw for driving the motor 2 based on the voltage command values Vu, Vv and Vw. For example, the drive portion 300 is formed with a converter which converts commercial three phase alternating-current power into direct-current power and an inverter which converts the direct-current power from the converter into the three phase alternating-current power. In this case, the voltage command values Vu, Vv and Vw are used as control voltages for the inverter. In this case, the voltage detector 302 described previously may detect, as the power supply voltage V, for example, a direct-current voltage in a DC between the converter and the inverter.

The current command generation portion 210 in the current control portion 200 will then be described in detail. FIG. 2 is a diagram showing the circuit configuration of the current command generation portion 210. The current command generation portion 210 shown in FIG. 2 includes a magnetic flux command computation portion 211, an excitation current command generation portion 212, a torque current command generation portion 213, the storage portion 214, a current frequency computation portion 215, a magnetic flux estimation portion 216, a determination portion 217 and a current command maximum value setting portion 218.

The magnetic flux command computation portion 211 generates a magnetic flux command value Φcmd for generation of the magnetic flux of the motor 2 based on the torque command value Tcmd and the actual speed value va of the motor 2.

The excitation current command generation portion 212 generates the excitation current command value Idcmd based on the magnetic flux command value Φcmd. When the generated excitation current command value Idcmd is higher than an excitation current command maximum value Idmax set by the current command maximum value setting portion 218, the excitation current command generation portion 212 limits the excitation current command value Idcmd to the excitation current command maximum value Idmax.

The torque current command generation portion 213 generates the torque current command value Iqcmd based on the torque command value Tcmd. When the generated torque current command value Iqcmd is higher than a torque current command maximum value Iqmax set by the current command maximum value setting portion 218, the torque current command generation portion 213 limits the torque current command value Iqcmd to the torque current command maximum value Iqmax.

The storage portion 214 stores a predetermined excitation current command maximum value Idmax0 for a steady state where the speed of the motor 2 is constant and a predetermined torque current command maximum value Iqmax0. The storage portion 214 also stores various types of parameters such as an allowable maximum current value Imax1 of the drive portion 300, an excitation inductance L of the motor 2, a mutual inductance M of the primary winding and the secondary winding of the motor 2, a slip constant (slip coefficient) Ks of the motor 2, the number P of polar pairs of the motor 2, a time constant τ which is determined by the circuit constant of the motor 2 and a constant K related to the vector control. The storage portion 214 may store the predetermined software (programs) for realizing the various types of functions of the speed control portion 100 and the current control portion 200 or may store the machining program including the speed command value vcmd. The storage portion 214 is a rewritable memory such as an EEPROM.

The current frequency computation portion 215 determines a slip frequency fs [Hz] by formula (4) below based on the excitation current command value Idcmd, the torque current command value Iqcmd and the slip constant (slip coefficient) Ks of the motor 2 stored in the storage portion 214.

$$fs = \text{Iqcmd}/\text{Idcmd} \times Ks \tag{4}$$

The current frequency computation portion 215 determines a current frequency f [Hz] of the drive current of the motor 2 by formula (5) below based on the slip frequency fs, the actual speed value va [rpm] of the motor 2 and the number P of polar pairs of the motor 2 stored in the storage portion 214.

$$f = va/60 \times P + fs \tag{5}$$

The magnetic flux estimation portion 216 estimates the current amount Φ of magnetic flux by formula (6) below based on the excitation current command value Idcmd, the mutual inductance M of the motor 2 stored in the storage portion 214, the time constant τ determined by the circuit constant of the motor 2 and an elapsed time t after the determination portion 217 determines that the motor 2 is in an accelerated state.

[Math. 1]

$$\Phi = M \times \text{Idcmd} \times (1 - e^{-t/\tau}) \tag{6}$$

The determination portion 217 determines, based on a variation in the speed command value vcmd in the machining program stored in the storage portion 214, whether the motor 2 is in an accelerated/decelerated state or in the steady state where the speed is constant. The determination portion 217 determines whether or not the current amount Φ of magnetic flux estimated by the magnetic flux estimation portion 216 reaches the magnetic flux command value Φcmd.

When the motor 2 is in the steady state where the speed is constant or when the motor 2 in the accelerated/decelerated state but the current amount Φ of magnetic flux reaches the magnetic flux command value Φcmd, the current command maximum value setting portion 218 sets, based on the result of the determination by the determination portion 217, the predetermined excitation current command maximum value Idmax0 and the predetermined torque current command maximum value Iqmax0 stored in the storage portion 214 to the excitation current command maximum value Idmax and the torque current command maximum value Iqmax, respectively.

Figure 3:
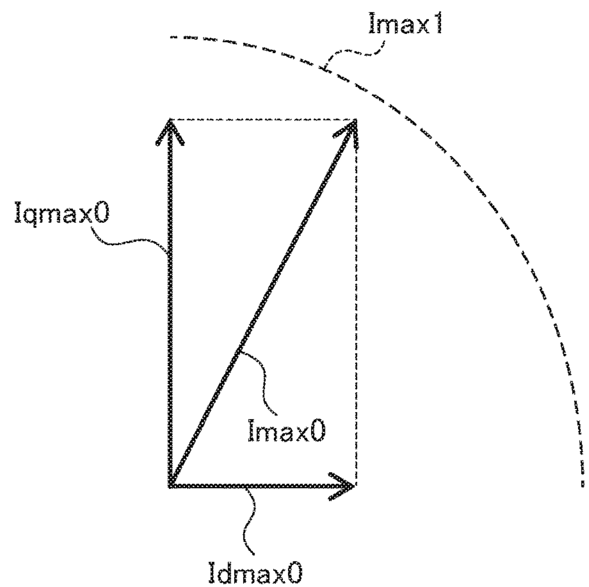
FIG. 3 is a diagram showing an example of a predetermined excitation current command maximum value and a predetermined torque current command maximum value for a steady state where the speed of the induction motor is constant.

FIG. 3 is a diagram showing an example of the predetermined excitation current command maximum value Idmax0 and the predetermined torque current command maximum value Iqmax0 for the steady state where the speed of the motor 2 is constant. As shown FIG. 3, the predetermined excitation current command maximum value Idmax0 and the predetermined torque current command maximum value Iqmax0 are set such that the drive current value Imax0 of the motor 2 is lower than the allowable maximum current value Imax1 of the drive portion 300. The predetermined torque current command maximum value Iqmax0 is set to, for example, about twice to three times the predetermined excitation current command maximum value Idmax0.

When the motor 2 is in the accelerated/decelerated state and the current amount Φ of magnetic flux lower than the magnetic flux command value Φcmd, the current command maximum value setting portion 218 changes, based on the result of the determination by the determination portion 217, instead of the predetermined excitation current command maximum value Idmax0, the excitation current command maximum value Idmax to a first excitation current command maximum value Idmax1 or a second excitation current command maximum value Idmax2 which will be described later.

Specifically, the current command maximum value setting portion 218 determines the first excitation current command maximum value Tdmax1 by formula (1) below based on the allowable maximum current value Imax1 of the drive portion 300 and the constant K related to the vector control stored in the storage portion 214.

$$Idmax1=Imax1/K \qquad (1)$$

In the present embodiment, the constant K related to the vector control is set to √(2) such that the torque of the motor 2 is maximized. The constant K is not limited to the present embodiment, and may be an arbitrary value.

The current command maximum value setting portion 218 determines a second excitation current command maximum value Idmax2 by formula (2) below based on the current frequency f computed by the current frequency computation portion 215, the power supply voltage V detected by the voltage detector 302 and the excitation inductance L of the motor 2 stored in the storage portion 214.

$$Idmax2=V/(2\pi f\times L) \qquad (2)$$

The second excitation current command maximum value Idmax2 is an upper limit for preventing voltage saturation where the power supply voltage V of the drive portion 300 is insufficient when the current frequency f of the drive current of the motor 2 is high, that is, when the motor 2 is operated at high speed.

The current command maximum value setting portion 218 determines, as the excitation current command maximum value Idmax, which one of the first excitation current command maximum value Idmax1 and the second excitation current command maximum value Idmax2 is lower.

Figure 4:
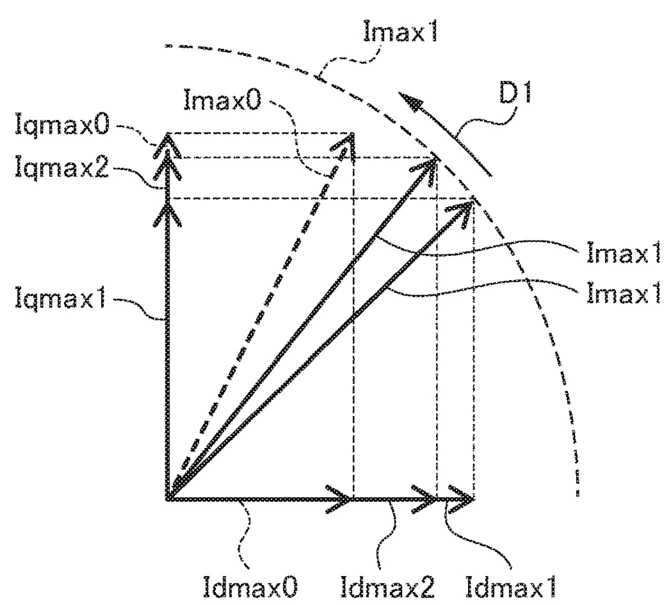
FIG. 4 is a diagram showing an example of a first excitation current command maximum value Idmax1 and a first torque current command maximum value Iqmax1 (Idmax1≤Iqmax2) and a second excitation current command maximum value Idmax2 and a second torque current command maximum value Iqmax2 (Idmax1>Iqmax2) for an accelerated/decelerated state of the induction motor.

FIG. 4 is a diagram showing an example of the first excitation current command maximum value Idmax1 and a first torque current command maximum value Iqmax1 (when Idmax1≤Iqmax2) and the second excitation current command maximum value Idmax2 and a second torque current command maximum value Iqmax2 (when Idmax1>Iqmax2) for the accelerated/decelerated state of the motor 2. As shown in FIG. 4, the first excitation current command maximum value Idmax1 and the second excitation current command maximum value Idmax2 are higher than the Predetermined excitation current command maximum value Idmax0.

The current command maximum value setting portion 218 determines the torque current command maximum value Iqmax by formula (3) below based on the excitation current command maximum value Idmax and the allowable maximum current value Imax1 which are determined.

$$Iqmax=\sqrt{(Imax1^2-Idmax^2)} \qquad (3)$$

Specifically, as shown in FIG. 4, when the excitation current command maximum value Idmax is set to the first excitation current command maximum value Idmax1, the torque current command maximum value Iqmax is set to the first torque current command maximum value Iqmax1 whereas when the excitation current command maximum value Idmax is set to the second excitation current command maximum value Idmax2, the torque current command maximum value Iqmax is set to the second torque current command maximum value Iqmax2.

Here, in the control device which performs the vector control, in general, upper limits (maximum values) are set for the excitation current command value and the torque current command value (for example, the predetermined excitation current command maximum value Idmax0 and the predetermined torque current command maximum value Iqmax0 described above). In general, these maximum values (for example, Idmax0 and Iqmax0 in FIG. 3) are set such that the drive current of the motor (for example, Imax0 in FIG. 3) is lower than the allowable maximum current value of the drive portion (for example, Imax1 in FIG. 3).

Figure 5:
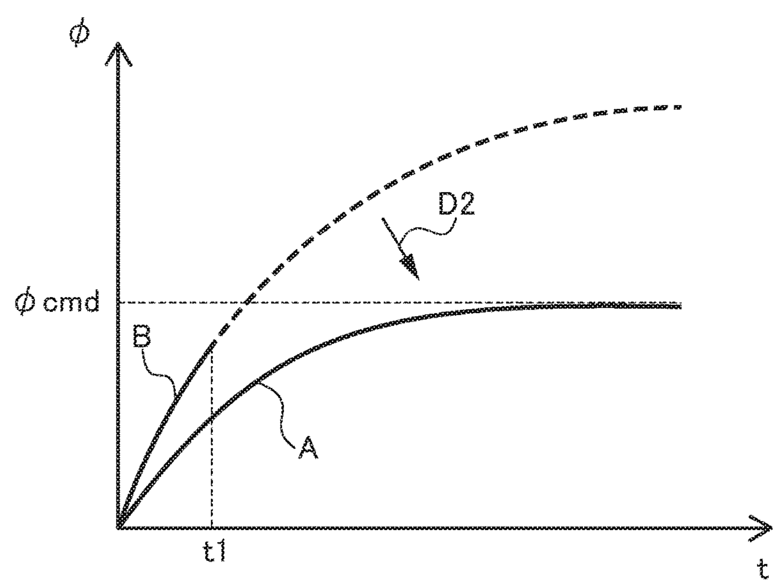
FIG. 5 is a diagram showing a time variation in magnetic flux when the induction motor is accelerated from a non-excited state.

Here, FIG. 5 is a diagram showing a time variation in the amount Φ of magnetic flux when the motor 2 is accelerated from a non-excited state. For example, when the motor 2 is accelerated from the non-excited state, the magnetic flux rises at the time constant τ determined by the circuit constant of the motor 2 (see formula (6) described previously). Hence, the rise of the magnetic flux until the magnetic flux reaches the desired amount Φcmd of magnetic flux after the start of flow of the excitation current is slow. Furthermore, when the excitation current command value Idcmd is limited to the predetermined excitation current command maximum value Idmax0, as shown in the curve A of FIG. 5, the rise of the magnetic flux is slower. Hence, a time necessary to accelerate/decelerate the motor 2 is disadvantageously long.

Hence, in the present embodiment, when the motor 2 is in the accelerated/decelerated state, the excitation current command maximum value Idmax is changed to the first excitation current command maximum value Idmax1 or the second excitation current command maximum value Idmax2 which is higher than the predetermined excitation current command maximum value Idmax0. In this way, as shown in the curve B of FIG. 5, the rise of the magnetic flux can be speeded up, and thus it is possible to reduce the time necessary to accelerate/decelerate the motor 2. An operation of changing the excitation current command maximum value Idmax and the torque current command maximum value Iqmax by the control device 1 will be described below.

FIG. 6 is a flowchart showing the operation of changing the excitation current command maximum value Idmax and the torque current command maximum value Iqmax by the control device 1.

The current frequency computation portion 215 first computes the current frequency f of the current drive current of the motor 2 by formulas (4) and (5) described previously (S1). The voltage detector 302 detects the current power supply voltage V (S1). The magnetic flux estimation portion 216 estimates the current amount Φ of magnetic flux by formula (6) described previously (S1).

Then, the determination portion 217 determines, based on a variation in the speed command value vcmd, whether or not the motor 2 in the accelerated state (S2). When the motor 2 is in the accelerated state (yes in step S2), the determination portion 217 determines whether or not the current amount Φ of magnetic flux estimated by the magnetic flux estimation portion 216 is lower than the magnetic flux command value Φcmd (S3).

When the motor 2 is in the steady state where the speed is constant (no step S2) or when the motor 2 is in the accelerated state but Φ reaches Φcmd (yes in step S2 and no in step S3), the current command maximum value setting portion 218 sets the predetermined excitation current command maximum value Idmax0 and the predetermined torque current command maximum value Iqmax0 to the excitation current command maximum value Idmax and the torque current command maximum value Iqmax, respectively (S4). Thereafter, the process returns to step S1.

On the other hand, when the motor 2 is in the accelerated state (yes in step S2), and Φ<Φcmd (yes in step S3), the current command maximum value setting portion 218 changes, instead of the predetermined excitation current command maximum value Idmax0, the excitation current command maximum value Idmax to the first excitation current command maximum value Idmax1 or the second excitation current command maximum value Idmax2.

Specifically, the current command maximum value setting portion 218 determines, based on the allowable maximum current value Imax1 of the drive portion 300, the first excitation current command maximum value Idmax1 by formula (1) described previously. The current command maximum value setting portion 218 also determines the second excitation current command maximum value Idmax2 by formula (2) described previously based on the current frequency f of the drive current of the motor 2, the power supply voltage V of the drive portion 300 and the excitation inductance L of the motor 2. The current command maximum value setting portion 218 determines, as the excitation current command maximum value Idmax, which one of the first excitation current command maximum value Idmax1 and the second excitation current command maximum value Idmax2 is lower (S5).

Here, the current command maximum value setting portion 218 determines the torque current command maximum value Iqmax by formula (3) described previously based on the excitation current command maximum value Idmax which are determined and the allowable maximum current value Imax1. Thereafter, the process returns to step S1.

The operations of steps S1 to S6 are repeatedly performed, for example, at predetermined time intervals. In this way, the excitation current command maximum value Idmax and the torque current command maximum value Iqmax are adjusted sequentially.

Here, the second excitation current command maximum value Idmax2 is varied depending on (in inverse proportion to) the current frequency f, that is, the actual speed value va of the motor 2 (see formulas (2) and (5) described previously), and thus when the speed of the motor 2 is low, Idmax1≤Idmax2 whereas when the speed of the motor 2 is high, Idmax1>Idmax2.

In this way, when the motor 2 is in the accelerated state, the speed of the motor 2 is low and Idmax1≤Idmax2, the excitation current command maximum value Idmax is set to the first excitation current command maximum value Idmax1. In other words, as shown in FIG. 4, the excitation current command maximum value Idmax is changed to the first excitation current command maximum value Idmax1 higher than the predetermined excitation current command maximum value Idmax0. In this way, as shown in the curve B of FIG. 5, the rise of the magnetic flux can be speeded up.

Here, as shown in FIG. 4, the torque current command maximum value Iqmax is changed to the first torque current command maximum value Iqmax1 lower than the predetermined torque current command maximum value Iqmax0 so as not to exceed the allowable maximum current value Imax1 of the drive portion 300.

In this way, the rise of the magnetic flux can be speeded up while preventing the allowable maximum current value Imax1 of the drive portion 300 from being exceeded, and thus it is possible to reduce the time until the desired amount Φcmd of magnetic flux is generated.

Thereafter, when the motor 2 is in the accelerated state, the speed of the motor 2 is increased and thus Idmax1>Idmax2 holds true, the excitation current command maximum value Idmax is set to the second excitation current command maximum value Idmax2. The second excitation current command maximum value Idmax2 is gradually decreased as the speed of the motor 2 is raised as described previously (a direction D1 indicated by an arrow of FIG. 4, and thus the excitation current command maximum value Idmax is set lower gradually as the speed of the motor 2 is raised.

Here, as shown in the curve B of FIG. 5, when the control using the first excitation current command maximum value Idmax1 is continued, the amount Φ of magnetic flux exceeds the desired amount Φcmd of magnetic flux. However, in the present embodiment, for example, at a time t1 before the amount Φ of magnetic flux exceeds the desired amount Φcmd of magnetic flux, the excitation current command maximum value Idmax is changed to the second excitation current command maximum value Idmax2 to be gradually decreased, with the result that the amount Φ of magnetic flux can be made to converge to the desired amount Φcmd of magnetic flux (a direction D2 indicated by an arrow of FIG. 5).

Here, as shown in the second torque current command maximum value Iqmax2 of FIG. 4, the torque current command maximum value Iqmax is set higher gradually as the speed of the motor 2 is raised so as not to exceed the allowable maximum current value Imax1 of the drive portion 300 (the direction D1 indicated by the arrow of FIG. 4).

As described above, as the speed of the motor 2 is raised, the increased excitation current command maximum value Idmax is returned so as to be gradually decreased, the decreased torque current command maximum value Iqmax is returned so as to be gradually increased and thus it is possible to reduce the time until the desired torque is generated while preventing the allowable maximum current value Imax1 of the drive portion 300 from being exceeded and preventing voltage saturation when the motor 2 operated at high speed.

As described above, the distribution of the excitation current command maximum value Idmax and the torque current command maximum value Iqmax in the accelerated state of the motor 2 is changed sequentially to the distribution thereof in the steady state where the speed is constant, and thus it is possible to reduce the time until the desired amount Φcmd of magnetic flux is generated and to reduce the time until the desired torque is generated. Consequently, it is possible to reduce the time necessary to accelerate/decelerate the motor 2.

Although in steps S2 and S3 and S5 and S6 of FIG. 6, the operation when the motor 2 in the accelerated state is illustrated, the same is true for an operation when the motor 2 is in the decelerated state.

As described above, in the control device 1 of the present embodiment, when the motor 2 is accelerated/decelerated, the excitation current command maximum value Idmax is changed to the first excitation current command maximum value Idmax1 based on the allowable maximum current value Imax1 of the drive portion 300 or the second excitation current command maximum value Idmax2 based on the power supply voltage V of the drive portion 300, the current frequency f of the drive current of the motor 2 and the excitation inductance L of the motor 2, and thus it is possible to increase the excitation current command maximum value Idmax as compared with the steady state where the speed is constant. In this way, it is possible to speed up the rise of the magnetic flux and to reduce the time necessary to accelerate/decelerate the motor 2.

In the control device 1 of the present embodiment, the excitation current command maximum value Idmax is changed to which one of the first excitation current command maximum value Idmax1 and the second excitation current command maximum value Idmax2 is lower. The first excitation current command maximum value Idmax1 is based on the allowable maximum current value Imax1 of the drive portion 300. On the other hand, the second excitation current command maximum value Idmax2 is the upper limit for voltage saturation when the motor 2 is operated at high speed. Here, the torque current command maximum value Iqmax is changed to the first torque current command maximum value Iqmax1 or the second torque current command maximum value Iqmax2 so as not to exceed the allowable maximum current value Imax1 of the drive portion 300. In this way, it is possible to speed up the rise of the magnetic flux while preventing the allowable maximum current value Imax1 of the drive portion 300 from being exceeded and preventing voltage saturation when the motor 2 is operated at high speed.

Incidentally, when the load of the motor 2 is light (that is, when the motor 2 has a low speed or a low torque), in order to reduce the heat generation of the motor, low magnetic flux control for reducing the magnetic flux may be performed. The control device 1 of the present embodiment has the effects even when the motor is accelerated/decelerated from the state where the magnetic flux is low as described above. In other words, in the control device 1 of the present embodiment, it is possible to realize both the reduction of the heat generation of the motor 2 at the time of a light load and the reduction of the time necessary to accelerate/decelerate the motor 2.

Although the embodiment of the present invention is described above, the present invention is not limited to the embodiment described above. The effects described in the present embodiment are simply a list of the most preferred effects produced from the present invention, and the effects of the present invention are not limited to those described in the present embodiment.

For example, although in the embodiment described above, the first excitation current command maximum value Idmax1 is determined based on the allowable maximum current value Imax1 of the drive portion 300, the first excitation current command maximum value Idmax1 may be determined based on which one of the allowable maximum current value of the drive portion 300 and the allowable maximum current value of the motor 2 is lower. The allowable maximum current value of the motor 2 can be increased by a heat dissipation mechanism, and thus the allowable maximum current value of the drive portion 300 is often lower than the allowable maximum current value of the motor 2.

Although in the embodiment described above, the current frequency f of the drive current of the motor 2 is determined based on the number P of polar pairs of the motor 2 (formula (5) described previously), instead of the number P of polar pairs, twice the value of the number of poles of the motor 2 may be used.

EXPLANATION OF REFERENCE NUMERALS

1 control device
2 motor (induction motor)
3 speed detector
100 speed control portion
200 current control portion
210 current command generation portion
211 magnetic flux command computation portion
212 excitation current command generation portion
213 torque current command generation portion
214 storage portion
215 current frequency computation portion
216 magnetic flux estimation portion
217 determination portion
218 current command maximum value setting portion
221 excitation current control portion
222 torque current control portion
223 dq-uvw conversion portion
224 dq-uvw conversion portion
300 drive portion
301 current detector
302 voltage detector

What is claimed is:

1. A control device of an induction motor which performs vector control on the induction motor, the control device comprising:

an excitation current command generation portion which Generates an excitation current command value based on a magnetic flux command value and which limits the excitation current command value based on an excitation current command maximum value;

a torque current command generation portion which generates a torque current command value based on a torque command value and which limits the torque current command value based on a torque current command maximum value;

a drive portion which supplies a drive current to the induction motor based on the excitation current command value and the torque current command value; and a current command maximum value setting portion which sets the excitation current command maximum value and the torque current command maximum value, wherein the current command maximum value setting portion changes, when the induction motor is accelerated/decelerated, the excitation current command maximum value based on which one of a first excitation current command maximum value and a second excitation current command maximum value is lower, and changes the torque current command maximum value based on the excitation current command maximum value and an allowable maximum current value of the induction motor or the drive portion, the first excitation current command maximum value is based on the allowable maximum current value and the second excitation current command maximum value is based on a power supply voltage of the drive portion, a current frequency of the drive current and an excitation inductance of the induction motor.

2. The control device of the induction motor according to claim 1, further comprising: a determination portion which determines whether or not the induction motor is in an accelerated/decelerated state.

3. The control device of the induction motor according to claim 2, further comprising: a magnetic flux estimation portion which estimates an amount of magnetic flux of the induction motor from the excitation current command value, a mutual inductance of the induction motor, a time constant of the induction motor and a time which elapses after the determination portion determines that the induction motor is in the accelerated/decelerated state, wherein the determination portion determines whether or not the amount of magnetic flux estimated by the magnetic flux estimation portion is lower than the magnetic flux command value, and when the induction motor is in the accelerated/decelerated state, and the amount of magnetic flux estimated by the magnetic flux estimation portion is lower than the magnetic flux command value, the current command maximum value setting portion changes the excitation current command maximum value and the torque current command maximum value.

4. The control device of the induction motor according to claim 1, further comprising: a current frequency computation portion which computes the current frequency of the drive current from an actual speed value of the induction motor, a number of polar pairs or a number of poles of the induction motor and a slip frequency of the induction motor.

5. The control device of the induction motor according to claim 1, further comprising: a voltage detection portion which detects the power supply voltage of the drive portion.

6. The control device of the induction motor according to claim 1, further comprising: a storage portion which stores the allowable maximum current value of the induction motor or the drive portion and the excitation inductance of the induction motor.

7. The control device of the induction motor according to claim 1, wherein the current command maximum value setting portion determines the first excitation current command maximum value Idmax1 by formula (1) below based on the allowable maximum current value Imax1 and a constant K related to the vector control, $$\mathrm{Idmax1} = \mathrm{Imax1} \times K \quad (1),$$

determines the second excitation current command maximum value Idmax2 by formula (2) below based on the power supply voltage V, the current frequency f and the excitation inductance L, $$\mathrm{Idmax2} = V/(2\pi f \times L) \quad (2),$$

determines, as the excitation current command maximum value Idmax, which one of the first excitation current command maximum value Idmax1 and the second excitation current command maximum value Idmax2 is lower and determines the torque current command maximum value Iqmax by formula (3) below based on the excitation current command maximum value Idmax which are determined and the allowable maximum current value Imax1, $$\mathrm{Iqmax} = \sqrt{(\mathrm{Imax1}^2 - \mathrm{Idmax}^2)} \quad (3).$$

8. The control device of the induction motor according to claim 7, wherein the constant K related to the vector control is $\sqrt{(2)}$.

* * * * *